United States Patent [19]
Rist et al.

[11] 3,771,821
[45] Nov. 13, 1973

[54] ELECTRONIC POWER CONTROL AND LOAD RATE CIRCUIT

[75] Inventors: Donald H. Rist; Joseph D. Schneider, both of Erie, Pa.

[73] Assignee: General Electric Company, Erie, Pa.

[22] Filed: Sept. 25, 1972

[21] Appl. No.: 291,688

[52] U.S. Cl............... 290/14, 290/17, 290/51, 322/14, 322/18, 322/23, 180/65, 105/61
[51] Int. Cl.............................................. B60l 11/04
[58] Field of Search ................. 290/14, 17, 27, 45; 180/65; 322/23, 14, 18; 105/49, 61, 62

[56] References Cited
UNITED STATES PATENTS

| | | | |
|---|---|---|---|
| 3,621,370 | 11/1971 | Vanderuort | 322/23 |
| 3,489,238 | 1/1970 | Kruckman | 180/65 |
| 3,565,202 | 2/1972 | Evans | 290/17 |
| 3,499,164 | 3/1970 | Ferre et al. | 290/17 |
| 3,551,685 | 12/1970 | Corry | 290/17 |
| 3,263,142 | 7/1966 | Adoutte et al. | 290/14 |
| 3,251,312 | 5/1966 | Livingston | 105/61 |

Primary Examiner—G. R. Simmons
Attorney—Walter C. Bernkopf et al.

[57] ABSTRACT

A control system for use in hybrid systems utilizing combustion engine, generator, and motor combinations for propulsion. The control system comprises a source of reference current for functional control of generator output and a circuit for bypassing a portion of the reference current away from the function controls in response to the position of an accelerator or brake pedal. The bypass circuit includes a capacitance network to generate a delay between any acceleration demands of the engine and a corresponding application of increased generator load, thereby eliminating engine bogging and reducing the production of smoke upon rapid increases of power demand. Potentiometers are adjustable to set the minimum idling speed of the engine and the maximum reference current to be applied for functional control. Fail safe circuitry is provided to assure that the system goes to a safe condition in the event of the failure of critical components.

18 Claims, 4 Drawing Figures

3,771,821

ELECTRONIC POWER CONTROL AND LOAD RATE CIRCUIT

BACKGROUND OF THE INVENTION

This invention relates generally to prime-mover dynamo systems and in particular to control systems for power application and load rate regulation of diesel electric propulsion systems.

It is known in the art of electric drives for vehicles to provide electric drive systems which comprise a prime mover, a generator coupled to the prime mover, and at least one traction motor receiving power from the generator. Typical systems of this type are found on diesel electric locomotives, and more recently on haulage trucks, where an alternating current generator is driven by a diesel engine and the output voltage of the generator is rectified to direct current and then applied to a plurality of d-c traction motors.

Diesel engines employed for traction applications generally develop substantially constant available horsepower for a given diesel engine speed on throttle setting. Stepped increases of available diesel engine horsepower are then attainable by increasing engine throttle settings to accordingly increase engine speed.

Generally, the actual load imposed on the diesel engine by the traction generators is limited to the available diesel engine horsepower. An increase in available horsepower accordingly results in a corresponding increase of generator load which may be applied. However, an increase of available engine power accompanied by a simultaneous increase of power demand or generator load frequently results in the generation of smoke. This results from a sudden application of fuel which upsets the proper air to fuel relationship required for efficient burning and minimum smoke until the diesel engine turbocharger has attained an adequate speed to provide sufficient air. It has accordingly been recognized that some smoke reduction under these conditions could be obtained by delaying the application of a load to the diesel engine for a short time period subsequent to an increase of throttle setting or diesel engine output power.

Traction propulsion systems of the type utilizing a diesel engine and traction generator conventionally utilize a power regulation control system which regulates the power output from the traction system in response to the available power output of the diesel engine. In such systems feedback signals responsive to the generator electrical output are compared to a reference current responsive to the available power of the diesel engine to generate a control signal for controlling generator excitation such as by modulating the generator field current, to thus control the generator output power. It is desirable that for each change in available horsepower that is made to the thermal prime mover, a corresponding increase in power demand is made from the generator. However, as mentioned hereinbefore, an immediate response to effect such a condition will produce undesirable affects in the form of smoke production.

In the locomotive field a common approach is to allow a momentary reduction in generator output power (sagging) until the prime mover reaches the higher speed called for, and then allowing the load to be increased to a corresponding higher level. For the conventional power regulation control system just described, this can be accomplished by momentarily reducing the reference current and subsequently increasing it to a level higher than that originally called for. However, where haulage trucks are concerned, large masses and comparatively smaller inertias are involved, and it is imperative that the power application is maintained. Otherwise, momentum may be lost, as for example, when a heavy load is being hauled up a steep incline, and the resulting decrease in speed will further complicate the problems inherent in acceleration.

It is therefore an object of this invention to provide in a diesel electric propulsion vehicle a control system to allow increases in power demand without any appreciable increases in smoke production.

Another object of this invention is the provision in a power control system for a delay in the application of increased generator load following an increase in power call from its prime mover.

Yet another object of this invention is the provision in a power control system for momentarily maintaining the generator load rate when the power call to its prime mover is increased.

Still another object of this invention is the provision in a propulsion control system for a combination circuit in which both power control and load rate control are obtained.

A further object of this invention is the provision in a power control system for fail safe circuitry to assure that the system goes to a safe condition in the event of any component failure.

Yet another object of this invention is the provision for a propulsion vehicle power control system which is simple to produce, functional in operation, and extremely effective in purpose.

These objects and other features and advantages become more readily apparent upon reference to the following description when taken in conjunction with the appended drawings.

SUMMARY OF THE INVENTION

Briefly, in accordance with one aspect of the invention a reference current utilized for functional control of generator power application is modulated to vary the applied load by selectively diverting a portion of the current therefrom to a bypass circuit connected thereacross. The extent to which current is bypassed and to which the reference current is reduced, is determined by accelerator and brake pedal positions. During the motoring mode of operation a potentiometer voltage responsive to accelerator pedal position establishes the level of bypass current and hence the amount of the load which is applied to the generator. Similarly, during the braking mode of operation its associated potentiometer is adjusted in accordance with the position of the brake pedal, thereby establishing the amount of current flow to the braking grids and the corresponding level of brake application. Engine bogging with attendant smoke production is virtually eliminated by the introduction in the motoring mode of operation a time delay between an instantaneous depression of the accelerator pedal calling for more power from the prime mover and the corresponding change of the reference current calling for the application of an increased generator load. A capacitance network in the bypass circuit causes the generator load to momentarily maintain its level when the accelerator is depressed, and to gradually increase as the speed of the prime mover increases to the new level called for.

Components are utilized in the circuit to provide dead bands with respect to particular ranges of movement by the accelerator and brake pedals. Additionally, fail safe circuitry is provided to assure that the system assumes a safe condition in the event of a component failure.

In the drawings as hereinafter described, a preferred embodiment is depicted; however, various other modifications and alternate constructions can be made thereto without departing from the true spirit and scope of the invention.

DESCRIPTION OF THE PREFERRED EMBODIMENT

Figure 1:
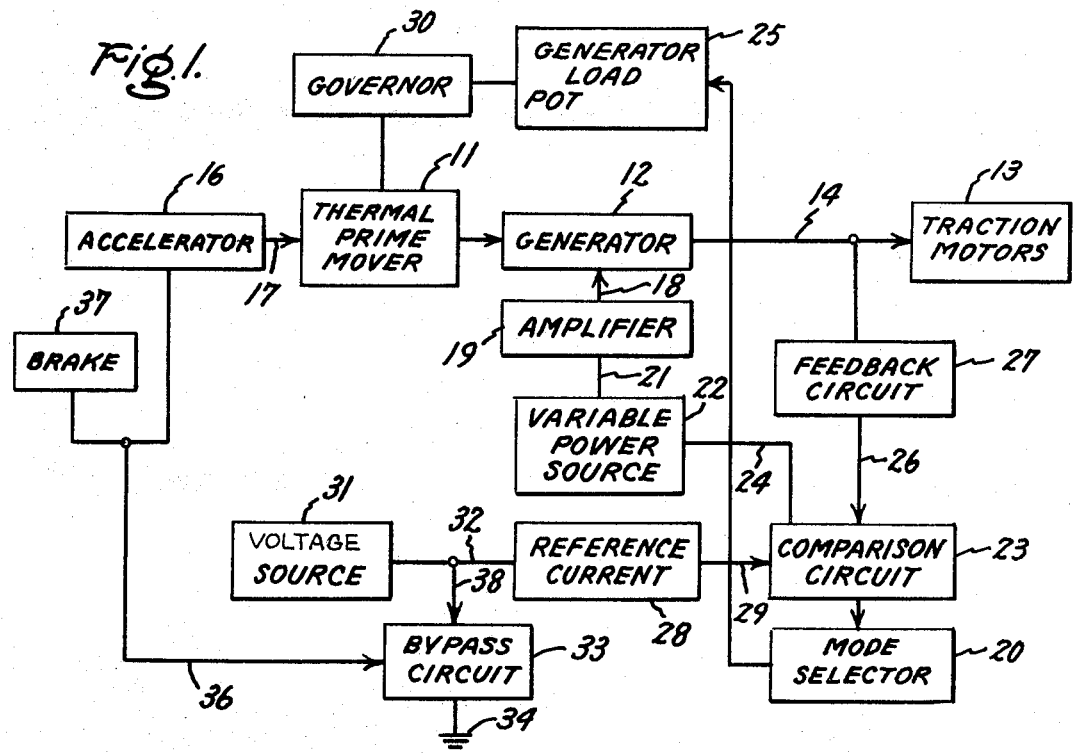
FIG. 1 is a simplified block diagram of a vehicle propulsion system as contemplated in the present invention.

Referring now to FIG. 1 a propulsion vehicle control system is shown wherein a thermal prime mover 11 such as a diesel engine or the like is connected to drive a generator 12 for the supply of electrical energy to one or more traction motors 13 through line 14. A similar arrangement alternately provides for direct current to the traction motors by rectifying the output from a driven alternator. The power being delivered to the generator 12 by the thermal prime mover 11 is determined by its speed which in turn is determined by the setting of the accelerator 16 connected thereto by linkage 17. Generator load control is accomplished by varying the input to the generator field along line 18 from an amplifier 19. The amplifier 19 which may be a rotary exciter is supplied by line 21 from a variable power source 22. Adjustment of the output of the power supply 22 by the output of a comparison circuit 23 along line 24 thus controls the field current of the generator 12 and thus the load imposed on the prime mover 11.

The comparison circuit 23 receives representative signals along line 26 from the generator output line 14 by way of the feedback circuit 27. Typically, the feedback signals are a pair of signals one representative of generator output voltage and the other representative of generator output current. These inputs are compared with a reference current 23 which is directed into the comparison circuit 23 along line 29 to provide the comparison circuit output to the variable power source. The generator output is thus a function of the reference current as adjusted in response to feedback change and by selectively varying the reference current the generator load can be controlled. Since a voltage source 31 is provided to supply power to the reference current 28 along line 32, the magnitude of the reference current 28 will be inversely related to that current which is drawn off line 32 by a bypass circuit 33 connected thereacross to ground 34. Control of the bypass circuit is maintained by a direct linkage 36 to the accelerator 16 and brake 37 to vary the amount of current drawn off by the bypass circuit 33. During periods of operation in a motoring mode, the accelerator controls the bypass circuit, whereas during periods of braking, the condition of the bypass circuit is determined by selective positioning of the brake 37. Since different levels of reference current are required for the motoring and braking modes of operation, provision is made for the adjustment thereof by the selective insertion in the mode selector 20 of various resistance networks which will hereinafter be described in more detail. Current passing through the mode selector then passes to a divider circuit (not shown) which includes a governor load potentiometer 25, and to a governor 30 which is mechanically linked to the thermal prime mover for a conventional speed control function.

Figure 2:
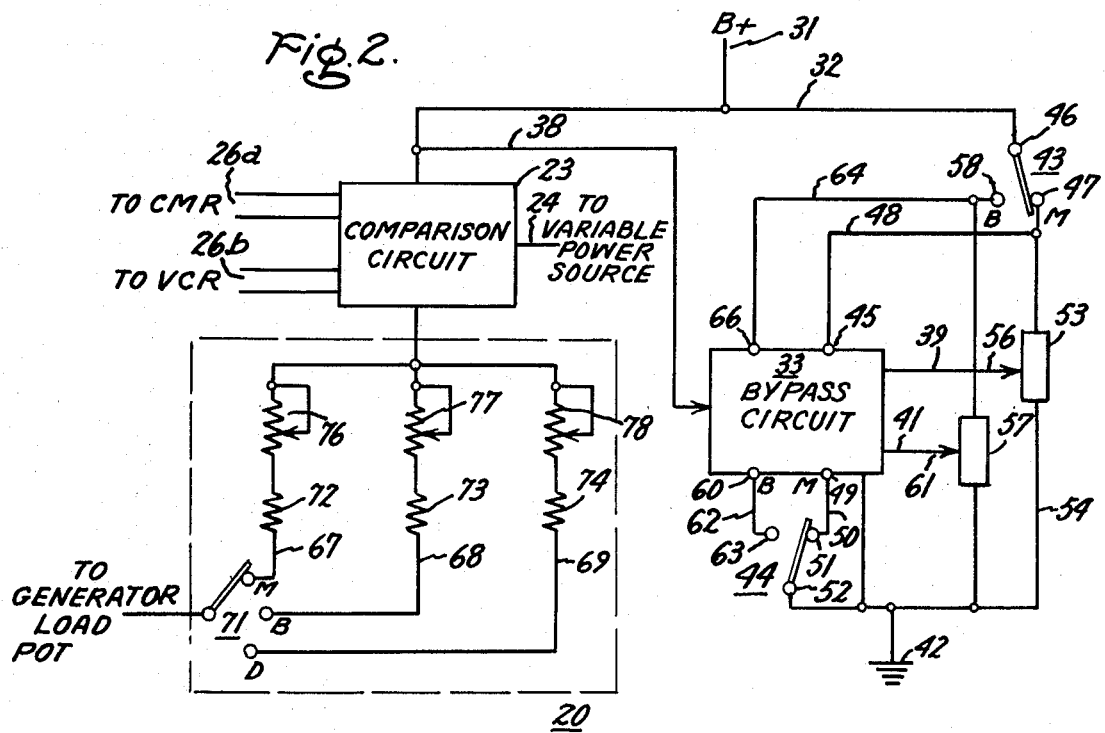
FIG. 2 is a portion thereof showing in schematic illustration the various switching modes for motoring and braking operations.

Operational mode selection between motoring and braking, and the means by which the bypass circuit is modulated in response to movement of the respective motoring and braking actuating devices is best understood by reference to FIG. 2. A conventional comparison circuit 23 similar to that described in U.S. Pat. No. 3,621,370 issued to T.L. Vandervort on Nov. 16, 1971, and assigned to the assignee of the present invention, receives feedback signals along lines 26a and 26b from a current measuring reactor (CMR) and a voltage measuring reactor (VCR), respectively. A reference current enters the comparison circuit 23 on line 29, and an output is produced at line 24 which is responsive to both the feedback from the generator output and the reference current as regulated by the bypass circuit 33 in diverting current from the voltage source 31 along line 38.

The amount of current diverted by the bypass circuit is responsive to that being received by the bypass circuit along either line 39 or 41, depending on whether operation is in the motoring or braking mode, respectively. Operation of the bypass circuit as a function of these variable currents will be hereinafter described in more detail.

The bypass circuit 33 is connected between the current source 31 and ground 42 with the path of the input current being determined by an input switch 43 and that of the output by an output switch 44. When the input switch 43 is placed in the motoring mode as shown in FIG. 2, the current flows from the current source 31 along the path indicated by the letter M and defined by the terminal 46, terminal 47, line 48, and into terminal 45 of the bypass circuit 33. Output current passes from terminal 49 to lead 50, terminal 51, terminal 52, and finally to ground 42. Connected across the bypass circuit is a potentiometer 53 coupled to terminal 47 and to ground 42 by lead 54. The potentiometer slider arm 56 is linked to the accelerator pedal (not shown) such that the voltage on the slider decreases with increased pedal depression. Typically, with the voltage source 31 at 75 volts, the voltage on the potentiometer during an idling condition will be 25 volts. Conversely, as the throttle is depressed to full throttle (90°), the voltage on the potentiometer will drop to zero. In the idle position the bypass current as determined by the voltage on the potentiometer 53 will then be a maximum, whereas in a full throttle condition the bypass current will be zero, and the reference current will be a maximum. As will be more fully described hereafter a capacitance network is provided in the bypass circuit to effect a delay between a change in accelerator pedal position and a corresponding change in the bypass current.

In the braking mode of operation the input and output switches 43 and 44 are placed in the alternative position from that shown in FIG. 2 with the circuit designed by the letter B being that which is activated. A second potentiometer 57 is coupled to terminal 58 and to ground 42 by lead 59. Its slider arm 61 is linked to the brake pedal (not shown) such that the voltage therein decreases with increased pedal depression. The voltage level on the potentiometer determines the amount of current bypassed by the bypass circuit from line 38 to terminal 60, lead 62, terminal 63, and terminal 52 to ground 42. No delay network is provided for operation in the braking mode. However, a lead 64 directly couples terminal 58 to a terminal 66 for a fail safe network that will be more fully described hereinafter.

The mode selector 20 which is coupled to the comparison circuit by lead 66 provides for the selective reference current level for each mode of operation. Leads 67, 68 and 69, utilized for the motoring, braking, and dumping modes respectively, are selectively switched in by a three way switch 71 having contactors M, B and D. The resistance 72, 73 and 74 provide for the desirable level of reference current for each mode, and the associated rheostats 76, 77 and 78 are utilized to set the maximum reference current that is desired for each mode of operation.

Figure 3:
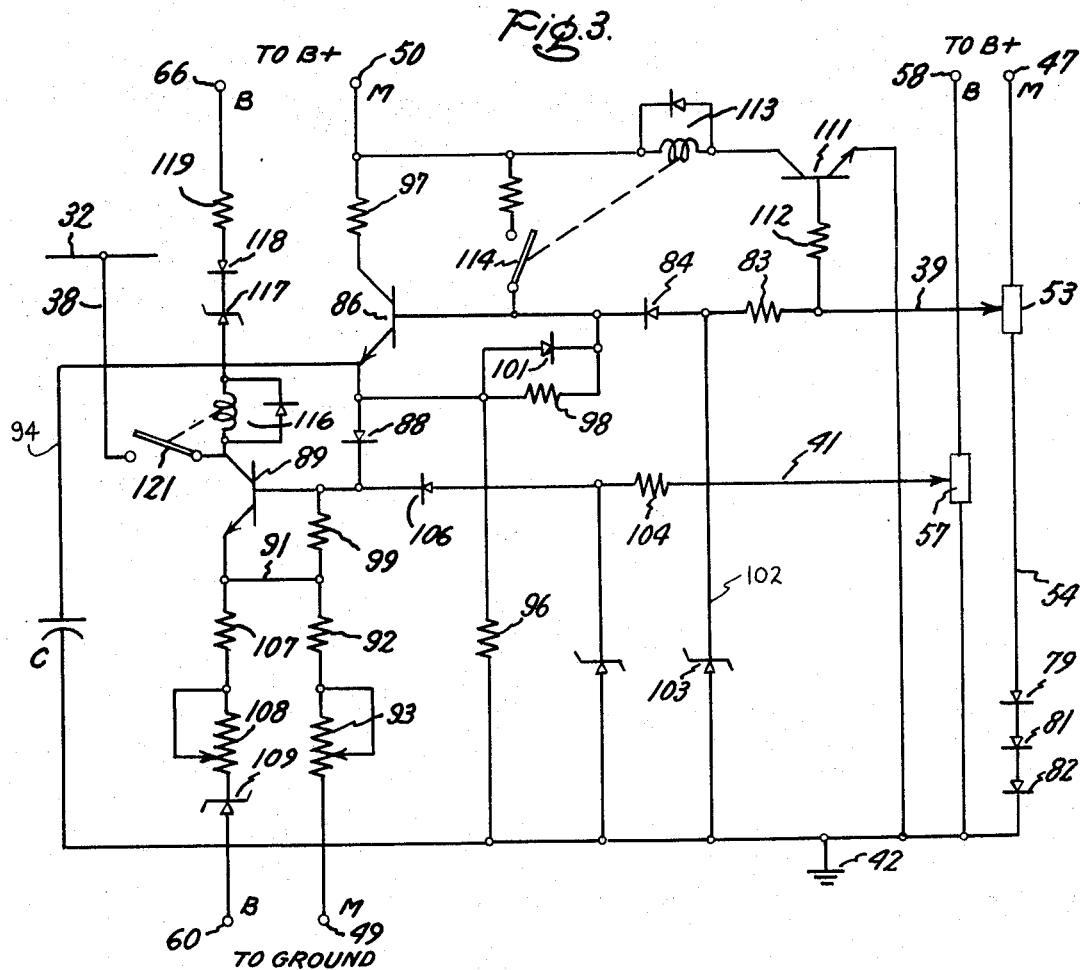
FIG. 3 is a schematic circuit diagram of the preferred embodiment of the invention.

Referring now to FIG. 3, the bypass circuit 33 is shown wherein current is diverted from line 32 in response to the amount of voltage on potentiometer 53 when operating in the motoring mode or on potentiometer 57 when operating in the braking mode. Input switch 43 (FIG. 2) is utilized to connect the power source to either terminal 47 or 58 for operation in the motoring or braking mode, respectively, and output switch 44 (FIG. 2) is similarly utilized to couple either terminal 49 or terminal 60 to ground.

In the motoring mode, current flow is from terminal 47, to potentiometer 53, line 54, through diodes 79, 81 and 82, and to ground 42. Voltage on the potentiometer 53 is transferred along line 39 through resistance 83 and diode, 84 to the base of transistor 86 whose collector is coupled through resistance 87 to the terminal 50. The emitter of transistor 86 is connected through diode 88 to the base of transistor 89 whose collector is coupled to receive current from line 38 and to cause a corresponding reduction in reference current. In the emitter circuit of transistor 89 is line 91, resistance 92, rheostat 93 and finally the terminal 49. Proper selection of the value of the resistance 92, along with selective adjustment of the rheostat 93, allows for the desirable setting of the minimum reference current which may exist.

The rate of change of reference current is limited by a rate circuit in the emitter of transistor 89 comprising lead 94, capacitor C, and the resistor 96. When the accelerator pedal is in the idle position the voltage at transistor 86 is a maximum and the reference current is correspondingly at a minimum. During the time that this higher voltage exists a charge is stored on the capacitor C. When the accelerator is rapidly depressed the voltage on the potentiometer 89 is reduced and the input diode 84 reverse biases which causes the emitter of the transistor 89 to delay with the time constant of the R-C network times the effective resistance of the transistor 89 and the reference current to rise at the same slow rate. The delay allows the speed of the prime mover to increase before the generator load is increased, thereby reducing the amount of smoke that is characteristically produced by overloading. Return to the idle position forward biases the diode 84 and restores the charge on the capacitor C quickly through transistor 86. This fast reset characteristic eliminates the possibility of ratcheting and ensures smoke control despite the occurrence of rapid accelerator pumping.

Protection for the transistors 86 and 89 against leakage current is preferably afforded by the connection of resistors 98 and 99, respectively, thereacross. These leads each provide a path for leakage current flow around their associated transistor. In addition, a diode 101 is preferably coupled across the transistor 86 to keep the voltage across the base emitter junction so as to protect the transistor 86 against excessive reverse voltages. Finally, a ground lead 102 with a zener diode 103 is preferably coupled to line 39 to ensure that the voltage to the transistor does not exceed a safe limit.

When operating in the braking mode of operation, the reference current as affected by the bypass circuit 33 is a function of the amount of current which flows to the braking grids. During periods when the brake pedal is in the idle position, the voltage on the potentiometer 57 is at a maximum and is transferred along line 41, through resistor 104 and diode 106 to the base of the transistor 89. Maximum current flows from its emitter circuit which now comprises resistance 107, rheostat 108 zener diode 109 and terminal 60, thereby causing a maximum current to be by-passed and the reference current to be at a minimum value. Under this condition the minimum reference current can be set by adjusting the rheostat 108 in the emitter circuit. Conversely, when the brake pedal is fully depressed the voltage on the potentiometer is at a minimum, the reference current is at a maximum value and dynamic braking effort is maximized.

Figure 4:
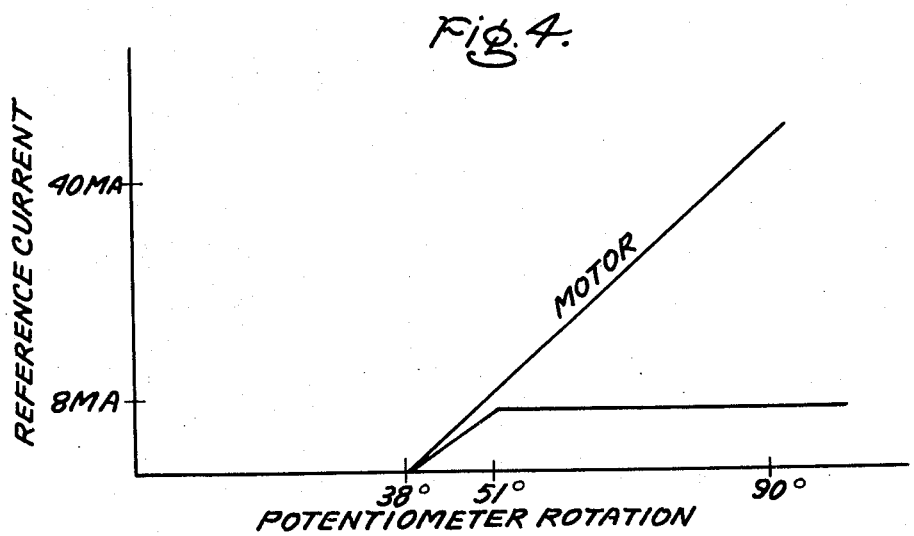
FIG. 4 is a graphic illustration of the control system reference current as a function of each of the accelerator and brake potentiometer rotation positions.

As mentioned hereinbefore, the maximum reference current in braking is set by the rheostat 77 (FIG. 2). In braking it is also desirable to have a dead band such that maximum braking will be applied over a range of pedal travel. This is accomplished with the zener diode 109. As braking increases, the voltage drops until the zener stops conducting, (maximum reference current). Further braking call will have no effect on the reference current. An example of typical motoring and braking curves and dead bands is shown in FIG. 4, wherein potentiometers having ranges of 330° and utilizing a 90° span are utilized. The dead bands at both ends of potentiometer rotation are adjustable together with maximum values. The dead band between 0° and 38° as shown is provided for motoring and braking by proper selection of the potentiometers 53 and 57 respectively. It should be noted that various other potentiometers and rotation spans can be utilized, the one illustrated being chosen only for the accommodation of a substantially linear translation of pedal movement to potentiometer rotation.

The failure mode of transistor 89 is normally a collector emitter short which represents a safe failure in motoring since reference current drops to zero. However, if the potentiometer 53 were to short to the battery negative, the bypass current would be reduced to zero and full power would be applied without control. To overcome this unsafe condition, the circuit preferably includes a transistor 111 as shown having its base connected to the line 39 through resistance 112, its emitter coupled to ground 42 and its collector connected to the positive terminal 50 through the coil of a relay 113 whose normally closed contacts 114 connect the positive terminal 50 to the base of transistor 86. If the potentiometer 53 is shorted to ground, diodes 79, 81 and 82 are shorted and the voltage normally existing between 54 and 42 is reduced to zero. This causes transistor 111 to turn off and drop out relay 113 whose contacts 114 will return to their normally closed condition to connect the positive terminal 50 to the base of the transistor 86. This results in turning on transistors 86 and 89 to reduce propulsion power to a minimum so as to place the circuit in a safe condition.

In braking a failure of transistor 89 would normally result in a complete loss of brakes. To protect against this occurrence, a relay 116 is connected from the collector of transistor 89 to the positive terminal 66 in series with a zener diode 117, a diode 118, and resistance 119. During normal operation the relay 113 whose normally closed contacts 120 complete the circuit in line 38, remains de-energized. But if the transistor 89 is shorted, sufficient voltage develops to activate the relay 113 which opens the contacts 114 in the bypass current path, thereby causing the reference current to increase to maximum and resulting in fall braking.

What I claim as new and desire to secure by letters Patent of the United States is:

1. An improved propulsion vehicle control system of the type having a thermal prime mover operable over a range of available power output levels to drive an electrical generator for energizing traction motors, said control system having a source of reference current for functional control of generator output and means for controlling generator output to reduce smoke produced by the thermal prime mover during increases of available power output, wherein the improvement comprises:
   a means for accelerating the thermal prime mover to increase available power output therefrom;
   b first means for bypassing a portion of the reference current away from the function controls in response to an accelerator pedal position of said acceleration means;
   c capacitance means connected across said bypass means to provide a delay between any increase of available power output from the thermal prime mover and the responsive application of an increased generator load.

2. A propulsion vehicle control system as set forth in claim 1 wherein said first bypass means includes an acceleration potentiometer whose voltage is responsive to said acceleration pedal position to establish the level of bypass current, and further wherein the voltage on the slider of said accelerator potentiometer decreases with increased depression of said accelerator pedal.

3. A propulsion vehicle control system as set forth in claim 1 and including:
   a means for retarding vehicle motion in response to movement of a brake pedal by utilizing the traction motors as generators and passing the resulting regenerative current through resistors;
   b means for modulating the amount of said regenerative current which flows to the resistors in response to the amount of reference current flowing to the function controls; and
   c second means for bypassing a portion of the reference current away from the function controls in response to the position of said brake pedal.

4. A propulsion vehicle control system as set forth in claim 3 wherein said second bypass means includes a braking potentiometer whose voltage is responsive to said brake pedal position to establish the level of said bypass current, and further wherein the voltage on the slider of said braking potentiometer decreases with increased depression of said brake pedal.

5. A propulsion vehicle control system as set forth in claim 4 wherein said second bypass means includes a zener diode which stops conducting when the voltage on said braking potentiometer is reduced to a predetermined level, thereby establishing a dead band such that maximum braking will be applied over a range of brake pedal movement.

6. A propulsion vehicle control system as set forth in claim 4 wherein said second bypass means comprises at least one transistor having its base voltage responsive to the voltage on said braking potentiometer and having its collector-emitter circuit conducting that portion of the reference current which is bypassed.

7. A propulsion vehicle control system as set forth in claim 6 and including a relay having its coil connected in series with a zener diode between collector of said transistor and a power source, and having its normally closed contacts in the bypass current path, wherein, during normal operation, said relay remains de-energized, but if said transistor shorts said relay is energized to open said bypass current path and cause maximum braking to occur.

8. A propulsion vehicle control system as set forth in claim 2 wherein said first bypass means comprises at least one control transistor having its base voltage responsive to the voltage on said acceleration potentiometer and having its collector-emitter circuit in the bypass current path.

9. A propulsion vehicle control system as set forth in claim 8 and including a second transistor having its collector-emitter circuit in series with the coil of a second relay between a power source and ground, and its base coupled to the slider of said acceleration potentiometer, the contacts of said second relay being normally closed to connect a power source to the base of said control transistor, wherein said transistor is normally turned on, but if said acceleration potentiometer is shorted said second transistor is turned off, said second relay contacts will close and the reference current to the function controls will be reduced to a minimum.

10. An improved traction vehicle propulsion system of the type having a thermal prime mover operable over a range of available power output levels to drive an electrical generator for energizing traction motors, the system having a control circuit receiving both a reference current input and feedback signals to provide a summed output for functional control of generator output, wherein the improvement comprises:
   a means for accelerating the thermal prime mover to increase available power output therefrom;
   b a bypass circuit connected across said control circuit for reducing said reference current input in response to the amount of current bypassed;
   c first means for modulating said bypass current in response to an accelerator pedal position of said acceleration means; and d means connected across said bypass means to provide a delay between any increase of available power output from the thermal prime mover and the responsive application of an increased generator load.

11. A traction vehicle propulsion system as set forth in claim 10 wherein said bypass circuit includes an accelerator potentiometer whose voltage is responsive to said accelerator pedal position to establish the level of bypass current, and further wherein the voltage on the slider of said accelerator potentiometer decreases with increased depression of said accelerator pedal.

12. A traction vehicle propulsion system as set forth in claim 10 and including:
  a means for retarding vehicle motion in response to movement of a brake pedal by utilizing the traction motors as generators and passing the resulting regenerative current through resistors;
  b means for adjusting the amount of regenerative current which flows to the resistors in response to the reference current input; and
  c second means for modulating said bypass current in response to the position of said brake pedal.

13. A traction vehicle propulsion system as set forth in claim 12 wherein said second modulating means includes a braking potentiometer whose voltage is responsive to said brake pedal position to establish the level of said bypass current, and further wherein the voltage on the slider of said braking potentiometer decreases with increased depression of said brake pedal.

14. A traction vehicle propulsion system as set forth in claim 13 wherein said second modulating means includes a zener diode which stops conducting when the voltage on said braking potentiometer is reduced to a predetermined level, thereby establishing a dead band such that maximum braking will be applied over a range of brake pedal movement.

15. A traction vehicle propulsion system as set forth in claim 13 wherein said second modulating means comprises at least one transistor having its base voltage responsive to the voltage on said braking potentiometer and having its collector emitter circuit conducting said bypass current.

16. A traction vehicle propulsion system as set forth in claim 15 and including a relay having its coil connected in series with a zener diode between the collector of said transistor and a power source, and having its normally closed contacts in the bypass current path, wherein during normal operation, said relay remains de-energized, but if said transistor shorts said relay is energized to open said bypass current path and cause maximum braking to occur.

17. A traction vehicle propulsion system as set forth in claim 11 wherein said bypass circuit comprises at least one control transistor having its base voltage responsive to the voltage on said accelerometer and having its collector-emitter circuit in the bypass current path.

18. A traction vehicle propulsion system as set forth in claim 17 and including a second transistor having its collector-emitter circuit in series with the coil of a second relay between a power source and ground, and it base coupled to the slider of said accelerator potentiometer, the contacts of said second relay being normally closed to connect a power source to the base of said control transistor, wherein said transistor is normally turned on, but if said accelerator potentiometer is shorted, said second transistor is turned off, said second relay contacts will close and the reference current input will be reduced to a minimum.

* * * * *

PO-1050
(5/69)

United States Patent Office
CERTIFICATE OF CORRECTION

Patent No. 3,771,821     Dated November 13, 1973

Inventor(s) Donald H. Rist and Joseph D. Schneider

It is certified that error appears in the above-identified patent and that said Letters Patent are hereby corrected as shown below:

Column 10, line 27 "it" should be corrected to -- its -- so that this line reads as follows:

"ond relay between a power source and ground, and its"

Signed and sealed this 16th day of April 1974.

(SEAL)
Attest:

EDWARD M. FLETCHER, JR.
Attesting Officer

C. MARSHALL DANN
Commissioner of Patents